United States Patent
Ding (10) Patent No.: US 11,489,360 B2
(45) Date of Patent: Nov. 1, 2022

(54) WIRELESS CHARGING CIRCUIT, WIRELESS CHARGING METHOD, WIRELESS CHARGING SYSTEM AND MOBILE TERMINAL

(71) Applicant: VIVO MOBILE COMMUNICATION CO.,LTD., Guangdong (CN)

(72) Inventor: Zhitao Ding, Chang'an Dongguan (CN)

(73) Assignee: VIVO MOBILE COMMUNICATION CO., LTD., Chang'an Dongguan (CN)

(*) Notice: Subject to any disclaimer, the term of this patent is extended or adjusted under 35 U.S.C. 154(b) by 196 days.

(21) Appl. No.: 16/634,097

(22) PCT Filed: Jul. 20, 2018

(86) PCT No.: PCT/CN2018/096431
§ 371 (c)(1),
(2) Date: Jan. 24, 2020

(87) PCT Pub. No.: WO2019/024694
PCT Pub. Date: Feb. 7, 2019

(65) Prior Publication Data
US 2020/0212706 A1 Jul. 2, 2020

(30) Foreign Application Priority Data
Jul. 31, 2017 (CN) .......................... 201710640369.2

(51) Int. Cl.
*H02J 7/00* (2006.01)
*H02J 7/04* (2006.01)
*H02J 50/80* (2016.01)

(52) U.S. Cl.
CPC .............. *H02J 7/04* (2013.01); *H02J 7/0036* (2013.01); *H02J 7/0068* (2013.01); *H02J 50/80* (2016.02)

(58) Field of Classification Search
CPC .. H02J 50/80; H02J 50/12; H02J 50/90; H02J 7/025; H02J 7/00034; H02J 50/40;
(Continued)

(56) References Cited

U.S. PATENT DOCUMENTS 9,899,848 B2    2/2018  Hu et al.
2012/0293009 A1  11/2012  Kim et al.
(Continued)

FOREIGN PATENT DOCUMENTS

CN          105098900 A      11/2015
CN          106532834 A       3/2017
(Continued)

OTHER PUBLICATIONS

CN Office Action dated Sep. 30, 2018 as received in Application No. 201710640369.2.
(Continued)

*Primary Examiner* — Binh C Tat
(74) *Attorney, Agent, or Firm* — Maschoff Brennan (57) ABSTRACT

A wireless charging circuit, a wireless charging method, a wireless charging system and a mobile terminal are provided. The wireless charging circuit includes: an acquisition unit that acquires voltage information of a battery in the mobile terminal; a charging control unit that obtains the voltage information of the battery, and determine current information of the battery according to the voltage information during a charging process of the battery; a first communication unit that transmits the voltage information and the current information of the battery to an external wireless charging device; a receiving unit that generates a charging Direct Current (DC) by inducing an electrical signal generated by the external wireless charging device according to the voltage information and the current information of the battery; and a switching unit configured to, when the switch-
(Continued)

ing unit is an on state, input the charging DC into the battery through the acquisition unit.

18 Claims, 5 Drawing Sheets

(58) Field of Classification Search
CPC .. H02J 7/00; H02J 50/10; H02J 50/402; H02J 7/0029; H02J 7/00304; H02J 7/02; H02J 50/20; H02J 7/0047; H02J 7/0068; H02J 5/005; H02J 7/0013; H02J 7/007182; H02J 7/00036; H02J 7/00308; H02J 50/60; H02J 50/70; H02J 7/00047; H02J 7/00714; H02J 7/045; H02J 50/005; H02J 7/00045; H02J 7/0021; H02J 7/0027; H02J 7/0031; H02J 7/0014; H02J 7/00306; H02J 7/00309; H02J 7/0042; H02J 7/0044; H02J 7/007; H02J 7/00712; H02J 7/0077; H02J 7/04; H02J 13/00007; H02J 13/00017; H02J 13/00024; H02J 13/00026; H02J 13/00028; H02J 13/0075; H02J 13/0086; H02J 2300/24; H02J 2300/28; H02J 3/381; H02J 3/383; H02J 3/386; H02J 3/46; H02J 50/50; H02J 7/35; H02J 2207/40; H02J 2310/22; H02J 5/00; H02J 7/00711; H02J 7/007184; H02J 7/007192; H02J 2207/20; H02J 2310/48; H02J 50/00; H02J 7/00032; H02J 7/0036; H02J 7/0071; H02J 7/007194; H02J 7/027; H02J 7/06; H02J 7/1423; H02J 7/24; H02J 13/00; H02J 13/00022; H02J 3/38; H02J 3/472; H02J 231/22; H02J 7/0048; H02J 7/0049; H02J 7/005; H02J 7/342; H04B 5/0087; H04B 3/54; H04B 2203/5441; H01H 39/00; H01H 77/10; H01H 85/12; H02M 7/003; H02M 1/32; B60L 53/12; B60L 50/66; B60L 53/14; B60L 53/22; H01F 27/24
USPC .................................................. 320/106–115
See application file for complete search history.

(56) References Cited

U.S. PATENT DOCUMENTS

| 2013/0307468 | A1* | 11/2013 | Lee ......................... | H02J 50/40 |
| | | | | 320/108 |
| 2014/0340033 | A1* | 11/2014 | Kim ....................... | H02J 7/0029 |
| | | | | 320/108 |
| 2015/0214748 | A1 | 7/2015 | Lin et al. | |
| 2016/0268815 | A1* | 9/2016 | Lee ......................... | H02J 7/025 |
| 2017/0040810 | A1* | 2/2017 | Hu .......................... | H02J 7/04 |
| 2017/0040818 | A1* | 2/2017 | Kong .................... | H04B 5/0037 |
| 2017/0353054 | A1* | 12/2017 | Lee ......................... | H02J 50/40 |

FOREIGN PATENT DOCUMENTS

| CN | 206211578 U | 5/2017 |
| CN | 107248769 A | 10/2017 |

OTHER PUBLICATIONS

Chinese Office Action issued in corresponding application No. 201710640369.2, dated Sep. 30, 2018.
European Search Report issued in corresponding application No. 18840522.9, dated Mar. 31, 2020.
International Written Opinion issued in corresponding application No. PCT/CN2018/096431, dated Oct. 25, 2018.

* cited by examiner

WIRELESS CHARGING CIRCUIT, WIRELESS CHARGING METHOD, WIRELESS CHARGING SYSTEM AND MOBILE TERMINAL

CROSS-REFERENCE TO RELATED APPLICATIONS

The present application is the U.S. national phase of PCT Application No. PCT/CN2018/096431 filed on Jul. 20, 2018, which claims a priority to Chinese Patent Application No. 201710640369.2 filed in China on Jul. 31, 2017, the disclosures of which are incorporated herein by reference in their entireties.

TECHNICAL FIELD

Embodiments of the present disclosure relate to the field of communications technologies, and in particular, to a wireless charging circuit, a wireless charging method, a wireless charging system, and a mobile terminal.

BACKGROUND

Wireless charging technology is a popular charging technology at present. Because energy is transferred between a charger and an electrical device through a magnetic field and there is no wire connected between them, there is no conductive contact exposed on the charger and the electrical device, and it has characteristics of convenient use, elegant and compact appearance, etc., and are widely used in electronic products such as mobile smart terminals.

In a traditional wireless charging scheme, a receiving terminal obtains a charging signal through an induction coil and then transmits it to a Direct Current (DC)-DC buck circuit. After being subjected to processes, such as a voltage drop process, a harmonic process, by the DC-DC buck circuit, the charging signal is transmitted to a battery to charge the battery.

The DC-DC buck circuit requires a switching operation of an inductor, which may bring switching loss and conduction loss of a Metal-Oxide-Semiconductor Field-Effect Transistor (MOSFET), and at same time, the inductor itself will introduce conduction loss, magnetic saturation loss, etc.; due to existence of these losses, overall power conversion efficiency of the wireless charging scheme in related art is low, and a large amount of heat is generated during a process of wireless charging, thereby limiting use of high voltage and high current for quick charging in the wireless charging technology in the related art.

SUMMARY

The present disclosure provides a wireless charging circuit, a wireless charging method, a wireless charging system, and a mobile terminal.

In one aspect, an embodiment of the present disclosure provides a wireless charging circuit applied to a mobile terminal, including: an acquisition unit, configured to acquire voltage information of a battery in the mobile terminal; a charging control unit, wherein the charging control unit is connected to the acquisition unit, and configured to obtain the voltage information of the battery acquired by the acquisition unit, and determine current information of the battery according to the voltage information during a charging process of the battery; a first communication unit, wherein the first communication unit is connected to the charging control unit, and configured to transmit the voltage information and the current information of the battery to an external wireless charging device; a receiving unit, configured to generate a charging DC by inducing an electrical signal, wherein the electrical signal is generated by the external wireless charging device according to the voltage information and the current information of the battery; and a switching unit, wherein one end of the switching unit is connected to the receiving unit, and the other end of the switching unit is connected to the acquisition unit, and the switching unit is configured to, when the switching unit is an on state, input the charging DC generated by the receiving unit into the battery through the acquisition unit.

On the other hand, an embodiment of the present disclosure further provide a wireless charging method, including: acquiring voltage information of a battery in a mobile terminal; determining current information of the battery according to the voltage information of the battery during a charging process of the battery; transmitting the voltage information and the current information of the battery to an external wireless charging device; generating a charging DC by inducing an electrical signal, wherein the electrical signal is generated by the external wireless charging device according to the voltage information and the current information of the battery; and inputting the charging DC into the battery.

On the other hand, an embodiment of the present disclosure further provides a wireless charging system, including a first wireless charging device and a second wireless charging device, wherein the first wireless charging device includes the wireless charging circuit provided by the above embodiments of the present disclosure; the first wireless charging device is configured to acquire voltage information of a battery in a mobile terminal, transmit the voltage information and the current information to the second wireless charging device, generate the charging DC by inducing the electrical signal, and input the charging DC into the battery, wherein the current information is current information of the battery during the charging process of the battery, the current information is generated based on the voltage information, and the electrical signal is generated by the second wireless charging device according to the voltage information and the current information of the battery; and the second wireless charging device is configured to generate a corresponding electrical signal according to the received voltage information and the received current information of the battery.

On the other hand, an embodiment of the present disclosure further provides a mobile terminal, including the wireless charging circuit provided by the above embodiments of the present disclosure.

BRIEF DESCRIPTION OF THE DRAWINGS

In order to illustrate the technical solutions in the embodiments of the present disclosure or the related art in a clearer manner, the drawings desired for the embodiments or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

Unless otherwise defined, technical or scientific terms used herein shall be of ordinary meanings as understood by those of ordinary skills in the art to which this disclosure belongs. The words "first", "second" and similar words used in the specification and claims of the present disclosure do not indicate any order, quantity, or importance, but are only used to distinguish different components. Similarly, the words "a" or "an" and similar words do not indicate a quantity limitation, but rather indicate that there is at least one. The words "connecting" or "connected" and similar words are not limited to physical or mechanical connections, but may include electrical connections, whether direct or indirect. The words "up", "down", "left", "right" or the like are only used to indicate relative positional relationship, and when an absolute position of the described object is changed, the relative positional relationship is also changed accordingly.

Figure 1:
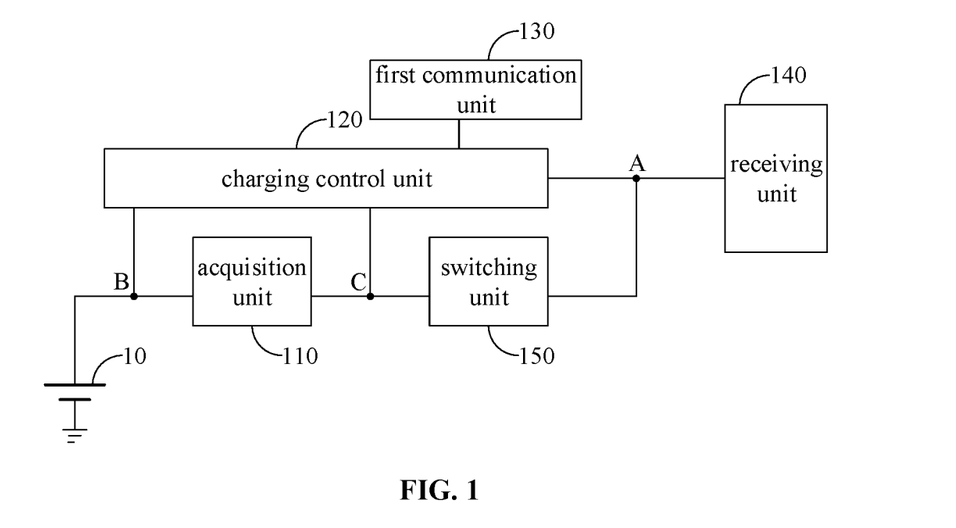
FIG. 1 is a first schematic structural diagram of a wireless charging circuit according to an embodiment of the present disclosure.
Figure 2:
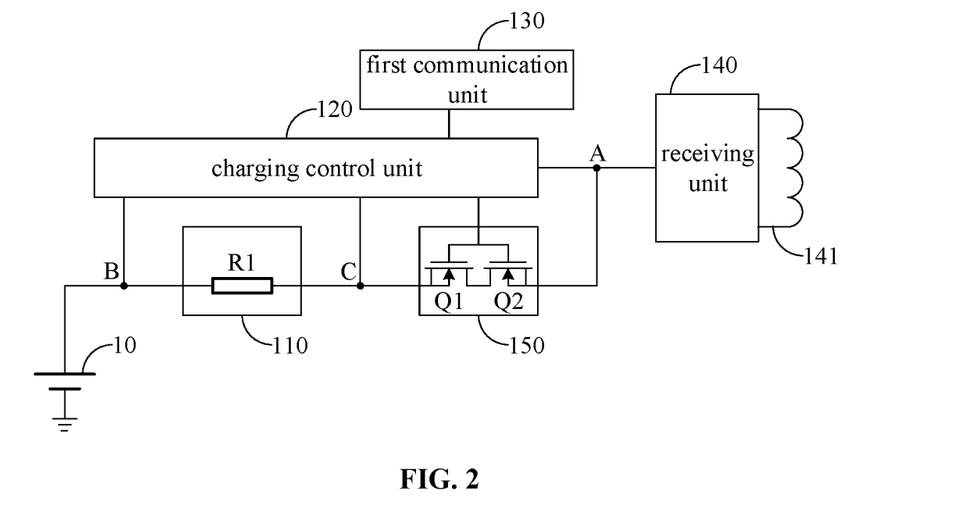
FIG. 2 is a second schematic structural diagram of a wireless charging circuit according to an embodiment of the present disclosure.
Figure 3:
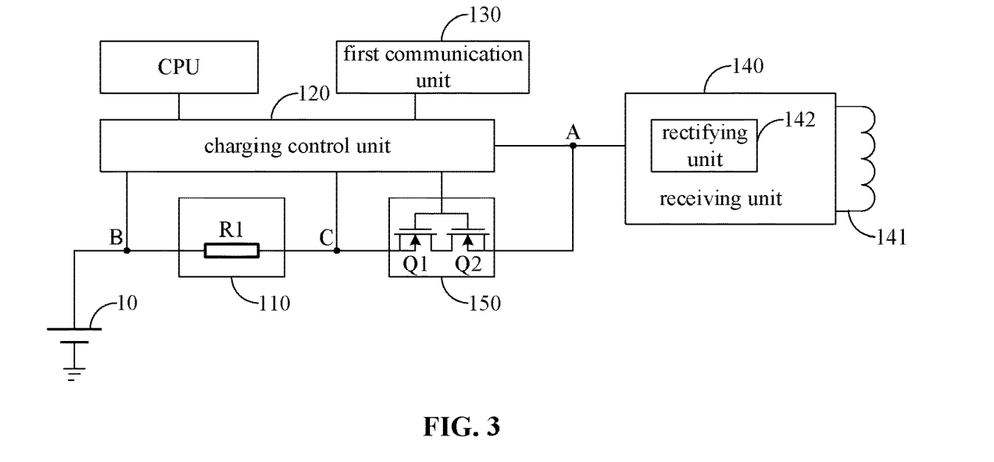
FIG. 3 is a third schematic structural diagram of a wireless charging circuit according to an embodiment of the present disclosure.

An embodiment of the present disclosure provides a wireless charging circuit, which is applied to a mobile terminal. As shown in FIGS. 1, 2, and 3, the wireless charging circuit may specifically include: an acquisition unit 110, configured to acquire voltage information of a battery 10 in the mobile terminal; a charging control unit 120, wherein the charging control unit 120 may be connected to the acquisition unit 110, and configured to obtain the voltage information of the battery 10 acquired by the acquisition unit 110, and determine current information of the battery 10 according to the voltage information of the battery 10 during a charging process of the battery 10; a first communication unit 130, wherein the first communication unit 130 may be connected to the charging control unit 120, and configured to transmit the voltage information and the current information of the battery 10 to an external wireless charging device (such as a second wireless charging device 620 shown in FIG. 6); a receiving unit 140, configured to generate a charging Direct Current (DC) by inducing an electrical signal, wherein the electrical signal is generated by the external wireless charging device according to the voltage information and the current information of the battery 10; and a switching unit 150, wherein one end of the switching unit 150 may be connected to the receiving unit 140, and the other end of the switching unit 150 may be connected to the acquisition unit 110, and the switching unit 150 is configured to, when the switching unit 150 is an on state, input the charging DC generated by the receiving unit 140 into the battery 10 through the acquisition unit 110.

In a specific embodiment, the acquisition unit 110 may specifically include a current sampling resistor R1 which has a preset resistance value, an end of the current sampling resistor R1 is connected to the battery 10 in the mobile terminal, and another end of the current sampling resistor R1 may be connected to the charging control unit 120 and the switching unit 150. Therefore, present voltage value of the battery 10 may be determined by detecting a voltage difference between two ends of the current sampling resistor R1.

The current sampling resistor R1 according to the embodiments of the present disclosure may specifically adopt any well-established and reliable resistor in the related art.

The charging control unit 120 according to the embodiments of the present disclosure is a logic control unit of the wireless charging circuit, and logically controls other devices in the wireless charging circuit through corresponding communication interactions, and has corresponding data acquisition and analysis functions.

The charging control unit 120 controls the external wireless charging device to adjust the electrical signal generated by the external wireless charging device by acquiring the voltage information of the battery 10 of the mobile terminal acquired by the acquisition unit 110 in real time and generating information such as current value information of corresponding charging current based on the voltage information, thus, the external wireless charging device is controlled to generate respective electrical signals at different stages of charging based on present power of the battery 10, so that the wireless charging circuit may generate corresponding charging DC by inducing the electrical signal, thus completing a DC charging process.

Since there is no need to provide an inductive device for realizing a voltage drop effect in the embodiments of the present disclosure, problems such as conduction loss, magnetic saturation loss, and high heat of an inductor itself may be avoided, thus power conversion efficiency and charging efficiency of the wireless charging circuit are significantly improved, and temperature of the mobile terminal is prevented from being too high during a wireless charging process, and wireless quick charging with high-voltage and high-current can be realized. Tests show that the power conversion efficiency of the wireless charging circuit provided by the embodiments of the present disclosure can be as high as 98%.

The charging control unit 120 according to the embodiments of the present disclosure may be implemented by using relatively well-established logic chips in the related art, such as MSM8976, MSM8996, MSM8953, MT6750, MT6752, etc., corresponding execution instructions or programs may be inputted, such that the above-mentioned logic chips may be provided with corresponding functions of the charging control unit 120 according to the embodiments of the present disclosure.

The charging control unit 120 may be specifically connected to the acquisition unit 110. By acquiring a voltage across the current sampling resistor R1 (that is, a voltage between a node B and a node C in FIG. 1) in the acquisition unit 110, the present voltage information of the battery 10 of the mobile terminal is determined through difference calculation.

The charging control unit 120 may further specifically communicate with devices, such as a central processing unit (CPU), included in the mobile terminal to obtain corresponding charging control information and working power, etc, to obtain corresponding charging control information, operating electrical power, and the like. The charging control unit 120 may specifically communicate with the CPU through a bus interface of an Internal Integrated Circuit ($I^2C$).

The first communication unit 130 according to the embodiments of the present disclosure may specifically obtain the voltage information of the battery 10 by interacting with the charging control unit 120 and the current information during the charging process of the battery 10 (the current information is generated by the charging control unit 120 according to the voltage information of the battery 10), and transmit the voltage information and the current information to the external wireless charging device through a preset communication mode.

In a specific implementation, the first communication unit 130 is further configured to transmit the voltage information and the current information of the battery 10 to the external wireless charging device through an induction coil. The above induction coil may specifically be an induction coil provided in the first communication unit 130, or may be an induction coil provided in the wireless charging circuit. In another specific embodiment, the first communication unit 130 is further configured to transmit the voltage information and the current information of the battery 10 to the external wireless charging device through a communication mode such as Bluetooth communication or infrared communication.

In the embodiments of the present disclosure, a communication protocol and a communication mode between the first communication unit 130 and an external wireless charging device may be determined in advance, thereby ensuring smooth communication between the first communication unit 130 and the external wireless charging device.

A communication process of the first communication unit 130 may be implemented under logic control of the charging control unit 120, that is, the first communication unit 130 may be communicatively connected with the charging control unit 120.

The first communication unit 130 according to the embodiments of the present disclosure may be implemented by using a known and well-established communication device. This is not limited in the embodiments of the present disclosure. The first communication unit 130 may be independently provided in the wireless charging circuit or may be provided in the charging control unit 120, so that the first communication unit 130 is integrated with the charging control unit 120 to reduce area of the wireless charging circuit.

The receiving unit 140 according to the embodiments of the present disclosure may be specifically provided with an induction coil 141, the receiving unit 140 may use the induction coil 141 to induce the electrical signal generated by the external wireless charging device through electromagnetic induction or the like, and convert the induced electrical signal into the corresponding charging DC.

The receiving unit 140 according to the embodiments of the present disclosure may be provided with a rectifying unit 142 therein, the rectifying unit 142 is configured to convert the electrical signal induced by the receiving unit 140 into the charging DC. In a specific embodiment, the rectifier unit may specifically adopt a full-bridge rectifier circuit.

The charging control unit 120 according to the embodiments of the present disclosure may also perform sampling detection on a DC charging circuit generated by the receiving unit 140 (that is, performing sampling detection on a charging DC at a node A in the wireless charging circuit shown in FIG. 1) to determine whether the voltage information and the current information of the charging DC correspond to a present voltage of the battery 10 and charging current information corresponding to the present voltage of the battery to ensure charging effect.

The charging control unit 120 is further configured to, when a sampling detection result indicates that the charging DC generated by the receiving unit 140 corresponds to the present voltage information and the present current information of the battery 10, control the switching unit 150 to be in the on state, so that the charging DC is inputted into the battery 10.

When the sampling test result indicates that the charging DC generated by the receiving unit 140 does not correspond to the present voltage information and the present current information of the battery 10, the charging control unit 120 is further configured to perform voltage and current compensation on the charging DC, to enable the compensated charging DC to correspond to the present voltage information and the present current information of the battery 10; or the charging control unit 120 is further configured to control the switching unit 150 to be in an off state to suspend charging, and trigger the first communication unit 130 to retransmit the voltage information and the current information of the battery 10, so that the external wireless charging device checks the generated electrical signal.

In the embodiments of the present disclosure, the charging control unit 120 may be connected to the acquisition unit 110 and the receiving unit 140 through an Analog-to-Digital Converter (ADC) circuit.

The switching unit 150 according to the embodiments of the present disclosure may be specifically connected to the acquisition unit 110, the charging control unit 120, and the receiving unit 140, respectively. Then, as can be seen from FIGS. 1, 2, and 3, the switching unit 150 and the acquisition unit 110 according to the embodiments of the present disclosure constitute a wireless direct charging path, and through this path, the charging DC outputted from the receiving unit 140 may be directly input into the battery 10 of the mobile terminal without passing through the inductor or the like.

The on state and the off state of the switching unit 150 may be specifically controlled by the charging control unit 120.

The switching unit 150 may be specifically composed of a load switch, a transistor, and the like. The load switch according to the embodiments of the present disclosure may specifically adopt known types, such as FZN12, FZN21, FZN25, and the like. The transistors according to the embodiments of the present disclosure may be implemented using known types, such as 2N7002, IRF540A, and the like.

In a specific embodiment, the switching unit 150 may specifically include: a first transistor Q1 and a second transistor Q2, and the first transistor Q1 and the second transistor Q2 may specifically be N-type transistors; a gate electrode of the first transistor Q1 may be connected to the charge control unit 120, a source electrode of the first transistor Q1 may be connected to the acquisition unit 110, and a drain electrode of the first transistor Q1 may be connected to the second transistor Q2; and a gate electrode of the second transistor Q2 may be connected to the charge control unit 120, a source electrode of the second transistor Q2 may be connected to the receiving unit 140, and a drain electrode of the second transistor Q2 may be connected to the first transistor Q1.

In the wireless charging circuit provided in the embodiments of the present disclosure, the following is provided in the wireless charging circuit: the acquisition unit, configured to acquire the voltage information of the battery in the mobile terminal; the charging control unit, wherein the charging control unit is connected to the acquisition unit, and configured to obtain the voltage information of the battery acquired by the acquisition unit, and determine the current information of the battery according to the voltage information during the charging process of the battery; the first communication unit, wherein the first communication unit is connected to the charging control unit, and configured to transmit the voltage information and the current information of the battery to the external wireless charging device; the receiving unit, configured to generate the charging DC by inducing the electrical signal, wherein the electrical signal is generated by the external wireless charging device according to the voltage information and the current information of the battery; and the switching unit, wherein the end of the switching unit is connected to the receiving unit, and the other end of the switching unit is connected to the acquisition unit, and the switching unit is configured to, when the switching unit is an on state, input the charging DC generated by the receiving unit into the battery through the acquisition unit. Therefore, the voltage information and the current information of the battery obtained in real time are used to control the external wireless charging device to generate respective electrical signals at different stages of charging, and the charging DC generated by inducing the electrical signal is directly inputted to the battery, thus power conversion efficiency and charging efficiency of the wireless charging system are significantly improved, and the temperature of the mobile terminal is prevented from being too high during the wireless charging process, and wireless quick charging with high-voltage and high-current may be realized.

The embodiments of the present disclosure further provides a wireless charging method, and the method may be specifically applied to the wireless charging circuit provided by the above embodiments of the present disclosure.

Figure 4:
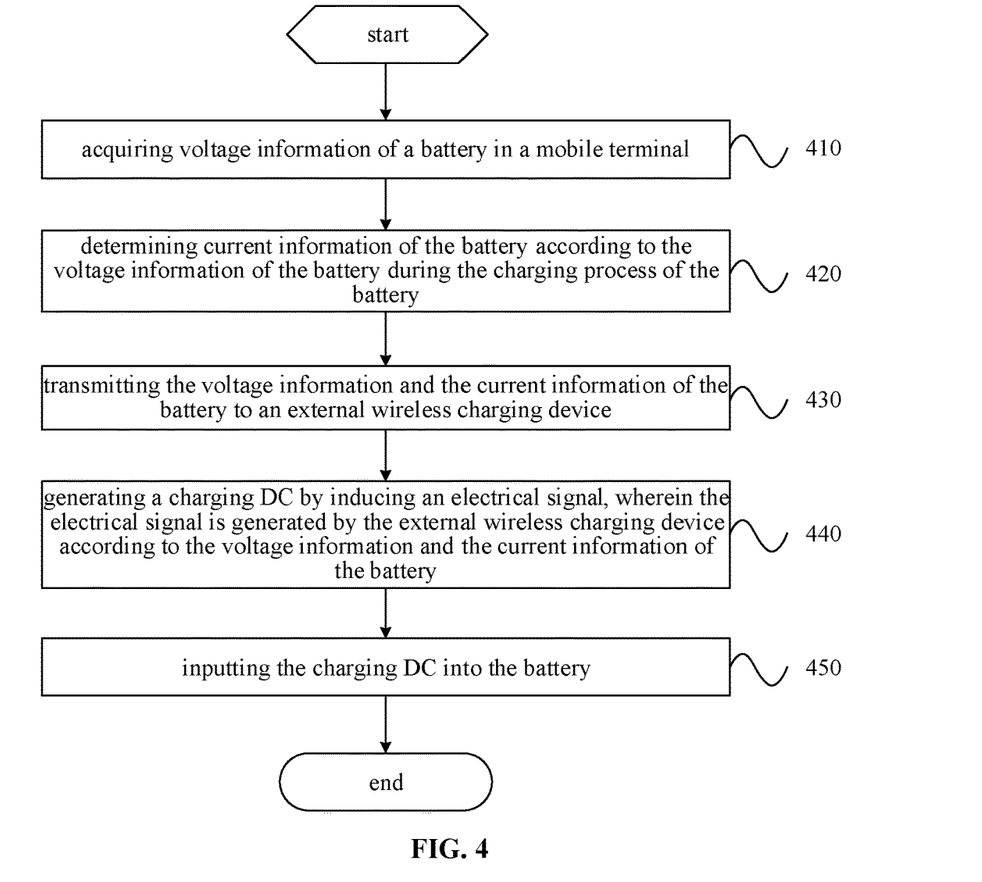
FIG. 4 is a first schematic flowchart of a wireless charging method according to an embodiment of the present disclosure.

As shown in FIG. 4, the method may specifically include following steps.

Step 410: acquiring the voltage information of the battery 10 in the mobile terminal.

Specifically, a voltage between two ends of the current sampling resistor R1 is acquired to determine the present voltage information of the battery 10.

Step 420: determining current information of the battery according to the voltage information of the battery 10 during the charging process of the battery.

After obtaining the present voltage information of the battery 10, the current information such as the current value required by the battery 10 during the charging process of the battery 10 is obtained through corresponding calculations.

Step 430: transmitting the voltage information and the current information of the battery 10 to the external wireless charging device.

Specifically, the voltage information and the current information of the battery 10 may be transmitted to the external wireless charging device through an induction coil, Bluetooth communication, infrared communication, etc., so as to control the external wireless charging device to adjust the electrical signal generated by the external wireless charging device, thus, the external wireless charging device is controlled to generate respective electrical signals at different stages of charging based on present power of the battery 10. Since the DC charging process may be completed without providing the inductive device, problems such as conduction loss, magnetic saturation loss, and high heat of an inductor itself may be avoided, thus power conversion efficiency and charging efficiency of the wireless charging circuit are significantly improved, and temperature of the mobile terminal is prevented from being too high during a wireless charging process, and wireless quick charging with high-voltage and high-current may be realized. Tests show that the power conversion efficiency of the wireless charging circuit provided by the embodiments of the present disclosure may be as high as 98%.

Step 440: generating the charging DC by inducing the electrical signal, wherein the electrical signal is generated by the external wireless charging device according to the voltage information and the current information of the battery 10.

Specifically, the induction coil may be used to induce the electrical signal generated by the external wireless charging device through electromagnetic induction and the like, and convert the induced electrical signal into the corresponding charging DC.

Step 450: inputting the charging DC into the battery.

In the embodiments of the present disclosure, the charging DC generated by induction may be directly input into the battery 10 through the switching unit in the on state without passing through devices such as an inductor, thereby avoiding phenomena of energy loss and heating, and significantly improving charging effect of the wireless DC.

In the wireless charging method provided in the embodiments of the present application, the voltage information of the battery obtained in real time are used to control the external wireless charging device to generate the corresponding electrical signals at the different stages of charging, and the charging DC generated by inducing the electrical signals is directly inputted to the battery, thus the power conversion efficiency and the charging efficiency of the wireless charging system are significantly improved, and the temperature of the mobile terminal is prevented from being too high during the wireless charging process, and wireless quick charging with high-voltage and high-current may be realized.

The embodiments of the present disclosure further provides a wireless charging method, which may be applied to the wireless charging circuit provided by the embodiments of the present disclosure described above.

Figure 5:
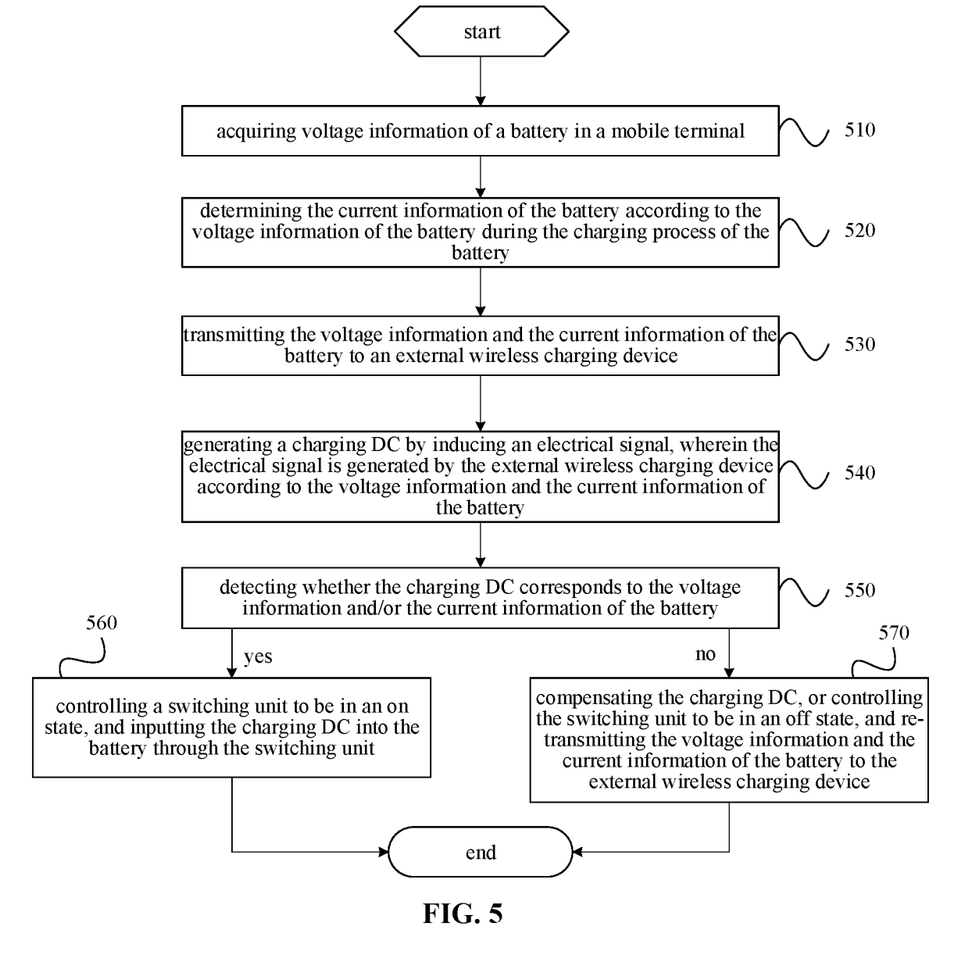
FIG. 5 is a second schematic flowchart of a wireless charging method according to an embodiment of the present disclosure.

As shown in FIG. 5, the method may specifically include following steps.

Step 510: acquiring the voltage information of the battery 10 in the mobile terminal.

Specifically, the voltage between two ends of the current sampling resistor R1 is acquired to determine the present voltage information of the battery 10.

Step 520: determining the current information of the battery according to the voltage information of the battery 10 during the charging process of the battery.

After obtaining the present voltage information of the battery 10, the current information such as the current value required by the battery 10 during the charging process of the battery 10 is obtained through corresponding calculations.

Step 530: transmitting the voltage information and the current information of the battery 10 to the external wireless charging device.

Specifically, the voltage information and the current information of the battery 10 may be transmitted to the external wireless charging device through an induction coil, Bluetooth communication, infrared communication, etc., so as to control the external wireless charging device to adjust the electrical signal generated by the external wireless charging device, thus, the external wireless charging device is controlled to generate respective electrical signals at different stages of charging based on present power of the battery 10.

Step 540: generating the charging DC by inducing an electrical signal, wherein the electrical signal is generated by the external wireless charging device according to the voltage information and the current information of the battery 10.

Specifically, the induction coil may be used to induce the electrical signal generated by the external wireless charging device through electromagnetic induction and the like, and convert the induced electrical signal into the corresponding charging DC through a rectification process.

Step 550: detecting whether the charging DC corresponds to the voltage information and/or the current information of the battery 10.

When a detection result indicates that the charging DC corresponds to the voltage information and/or the current information of the battery 10, step 560 is performed; when the detection result indicates that the charging DC does not correspond to the voltage information and/or the current information of the battery 10, step 570 is performed.

Step 560, controlling the switching unit to be in the on state, and inputting the charging DC into the battery 10 through the switching unit.

When the charging DC corresponds to the voltage information and the current information of the battery 10, it indicates that the charging DC is a required charging current. By controlling the switching unit to be in the on state, the charging DC is inputted into the battery 10 through the switching unit, so that wireless quick charging with high-voltage and high-current may be realized, and the charging effect of the wireless charging DC may be significantly improved.

Step 570: compensating the charging DC, or controlling the switching unit to be in the off state, and re-transmitting the voltage information and the current information of the battery 10 to the external wireless charging device.

When the charging DC does not correspond to the voltage information and the current information of the battery 10, the charging DC may be compensated so that the compensated charging DC is the required charging current.

Alternatively, the switching unit may be controlled to be in an off state, that is, the wireless direct charging path is disconnected, and the first communication unit is controlled to retransmit the voltage information and the current information of the battery 10 to the external wireless charging device, so that a correct power signal is generated by the external wireless charging device.

Implementation of this embodiment may ensure the charging effect of wireless DC charging by detecting the generated charging DC.

Figure 6:
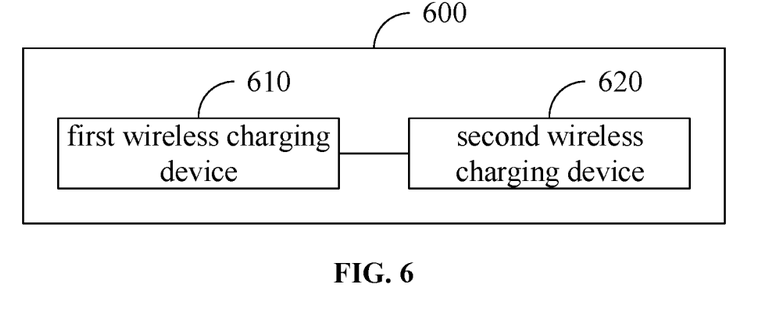
FIG. 6 is a first schematic structural diagram of a wireless charging system according to an embodiment of the present disclosure.

The embodiments of the present disclosure further provide a wireless charging system 600. As shown in FIG. 6, the wireless charging system may specifically include a first wireless charging device 610 and a second wireless charging device 620.

The first wireless charging device 610 may specifically include the wireless charging circuit provided by the above embodiments of the present disclosure.

The first wireless charging device 610 may be specifically configured to acquire the voltage information of the battery 10 in the mobile terminal, transmit the voltage information and the current information of the battery 10 to the second wireless charging device 620, generate the charging DC by inducing the electrical signal, and input the charging DC into the battery 10, wherein the current information is current information of the battery 10 during the charging process of the battery 10, the current information is generated based on the voltage information, and the electrical signal is generated by the second wireless charging device 620 according to the voltage information and the current information of the battery 10.

Detailed descriptions of the first wireless charging device 610 provided in the embodiments of the present disclosure may refer to descriptions of the wireless charging circuit shown in FIGS. 1-3 described above. It will not be repeated herein.

The second wireless charging device 620 may be specifically configured to generate the corresponding electrical signal according to the received voltage information and the received current information of the battery 10.

Figure 7:
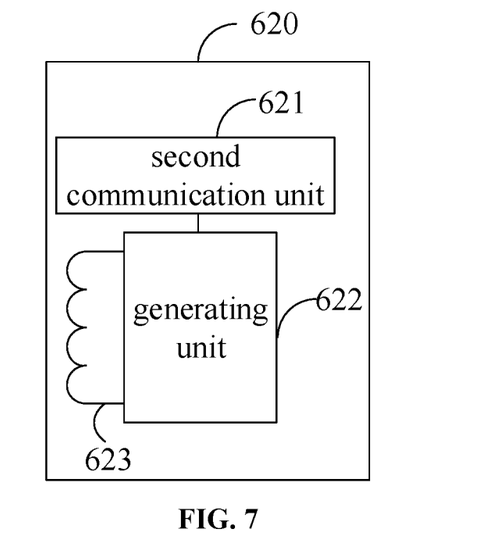
FIG. 7 is a second schematic structural diagram of a wireless charging system according to an embodiment of the present disclosure.

As shown in FIG. 7, the second wireless charging device 620 may specifically include: a second communication unit 621, configured to receive the voltage information and the current information of the battery 10 transmitted by the first communication unit 130 in the first wireless charging device 610; and a generating unit 622, configured to generate a corresponding electrical signal based on the voltage information and the current information of the battery 10 received by the second communication unit 621.

In a specific embodiment, the generating unit 622 may specifically include an induction coil 623.

The wireless charging system provided by the embodiments of the present disclosure obtains the present voltage information of the battery in real time through the first wireless charging device to control the second wireless charging device to generate respective electrical signals at different stages of charging, and the charging DC generated by inducing the electrical signal is directly inputted into the battery 10 by the first wireless charging device, thus the power conversion efficiency and the charging efficiency of the wireless charging system are significantly improved, and the temperature of the mobile terminal is prevented from being too high during the wireless charging process, and wireless quick charging with high-voltage and high-current may be realized.

The embodiments of the present disclosure further provide a mobile terminal, and the mobile terminal may specifically include the wireless charging circuit shown in the above-mentioned FIGS. 1, 2, and 3.

In addition to the wireless charging circuit, structures and functions of the mobile terminal may be similar to those in the related art, and the specific structural composition and implementation process of the wireless charging circuit of the mobile terminal may refer to descriptions and explanations of the above embodiments, which will not be repeated herein.

The mobile terminal provided in the embodiments of the present disclosure controls the external wireless charging device to generate the respective electrical signals at different stages of charging by acquiring the present voltage information of the battery 10 in real time, and directly inputs the charging DC generated by inducing the electrical signals into the battery 10, thus the power conversion efficiency and the charging efficiency of the wireless charging system are significantly improved, and the temperature of the mobile terminal is prevented from being too high during the wireless charging process, and wireless quick charging with high-voltage and high-current may be realized.

An embodiment of the present disclosure further provides a mobile terminal, including a processor, a memory, and a computer program stored on the memory and executable on the processor. The computer program is configured to be executed by the processor, to implement each process of the above wireless charging method embodiment, and may achieve same technical effect. To avoid repetition, it is not repeated herein.

An embodiment of the present disclosure further provides a computer-readable storage medium, and a computer program is stored on the computer-readable storage medium. The computer program is configured to be executed by the processor, to implement each process of the above wireless charging method embodiment, and may achieve the same technical effect. To avoid repetition, it is not repeated herein. The computer-readable storage medium is, for example, a Read-Only Memory (ROM), a Random Access Memory (RAM), a magnetic disk or an optical disk.

Figure 8:
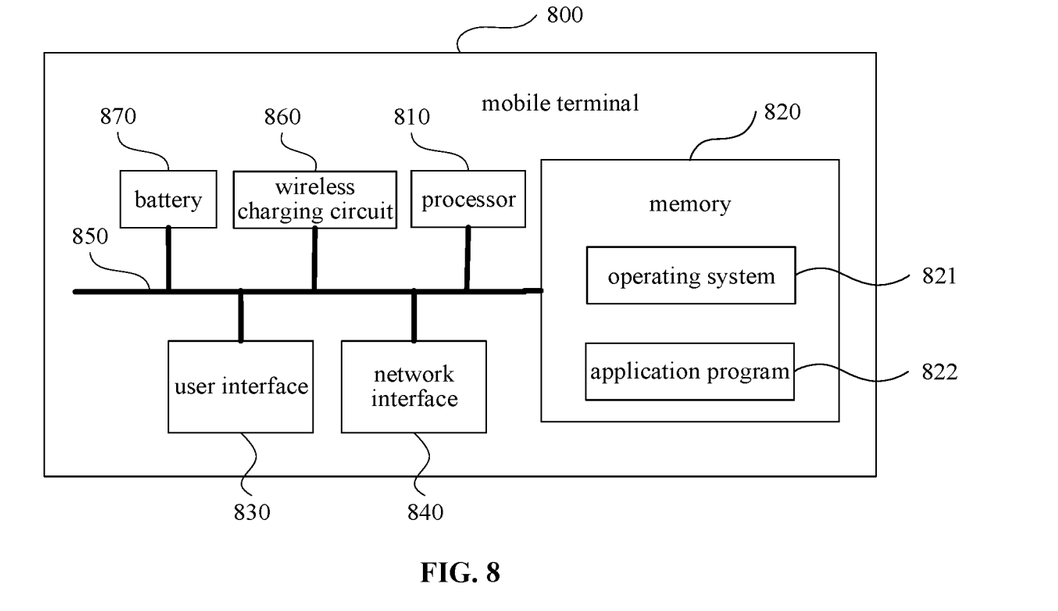
FIG. 8 is a first schematic structural diagram of a mobile terminal according to an embodiment of the present disclosure.

FIG. 8 is a block diagram of a mobile terminal 800 according to another embodiment of the present disclosure. The mobile terminal 800 shown in FIG. 8 includes: at least one processor 810, a memory 820, at least one network interface 840, a user interface 830, the wireless charging circuit 860 provided in the above embodiments of the present disclosure and the battery 870. Various components in the mobile terminal 800 are coupled together by a bus system 850. It should be appreciated that the bus system 850 is used to implement connection communication between these components. In addition to a data bus, the bus system 850 includes a power bus, a control bus, and a status signal bus. However, for clarity of description, various buses are all labeled as the bus system 850 in FIG. 8.

The user interface 830 may include a display, a keyboard, or a pointing device (for example, a mouse, a trackball, a touch pad, or a touch screen, etc.).

It should be appreciated that the memory 820 in this embodiment of the present disclosure may be a volatile memory or a non-volatile memory, or may include both the volatile memory and the non-volatile memory. The non-volatile memory may be a ROM, a Programmable Read Only Memory (PROM), an Erasable Programmable Read Only Memory (EPROM), an Electrically Erasable Programmable Read Only Memory (EEPROM) or flash memory. The volatile memory may be a RAM that acts as an external cache. By way of example and not limitation, many forms of RAMs may be used, such as a Static Random Access Memory (SRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a Synch Link Dynamic Random Access Memory (SLDRAM) and a Direct Rambus Random Access Memory (DRRAM). The memory 820 of the systems and methods described herein is intended to include, without being limited to, these and any other suitable types of memories.

In some embodiments, the memory 820 stores the following elements, executable modules or data structures, or a subset thereof, or an extended set thereof: an operating system 821 and an application program 822.

The operating system 821 includes various system programs, such as a framework layer, a core library layer and a driver layer, for implementing various basic services and processing hardware-based tasks. The application 822 includes various applications, such as a Media Player and a Browser, for implementing various application services. A program implementing the method of the embodiments of the present disclosure may be included in the application 822.

In the embodiments of the present disclosure, the mobile terminal 800 further includes a computer program stored on the memory 820 and executable on the processor 810, specifically, it may be a computer program in the application 822, and the computer program is configured to be executed by the processor 810 to implement the following steps: acquiring voltage information of the battery 870 in the mobile terminal 800; determining current information of the battery 870 according to the voltage information of the battery 870 during a charging process of the battery 870; transmitting the voltage information and the current information of the battery 870 to the external wireless charging device; generating the charging DC by inducing the electrical signal, wherein the electrical signal is generated by the external wireless charging device according to the voltage information and the current information of the battery 870; and inputting the charging DC into the battery 870.

The method disclosed in the above embodiments of the present disclosure may be applied to the processor 810, or implemented by the processor 810. The processor 810 may be an integrated circuit chip with signal processing capabilities. In an implementation process, each step of the above method may be completed by an integrated logic circuit of hardware in the processor 810 or an instruction in a form of software. The processor 810 may be a general-purpose processor, a Digital Signal Processor (DSP), an Application Specific Integrated Circuit (ASIC), a Field Programmable Gate Array (FPGA), or other programmable logic devices, discrete gate or transistor logic devices, and discrete hardware components. Various methods, steps, and logical block diagrams disclosed in the embodiments of the present disclosure may be implemented or executed. The general-purpose processor may be a microprocessor or the processor may be any conventional processor or the like. The steps of the method disclosed in combination with the embodiments of the present disclosure may be directly embodied as being executed by a hardware decoding processor, or being executed by using a combination of hardware and software modules in a decoding processor. The software module may be located in a well-established storage medium in the art, such as a random access memory, a flash memory, a read-only memory, a programmable read-only memory, or an electrically erasable programmable memory, a register, and the like. The storage medium is located in the memory 820, and the processor 810 reads information in the memory 820 and completes the steps of the above method in combination with its hardware.

It should be appreciated that the embodiments described herein may be implemented by hardware, software, firmware, middleware, microcode, or a combination thereof. For hardware implementation, the processing unit can be implemented in one or more ASICs, DSPs, Digital Signal Processing Devices (DSPDs), Programmable Logic Devices (PLDs), FPGAs, general-purpose processors, controllers, microcontrollers, microprocessors, and other electronic units for performing functions of this application or a combination thereof.

For software implementation, techniques described herein may be implemented by modules (such as procedures, functions) that perform the functions described herein. Software codes may be stored in a memory and executed by a processor. The memory can be implemented in the processor or external to the processor.

Optionally, the computer program is configured to be executed by the processor 810, to implement the following steps: acquiring the voltage between two ends of the current sampling resistor, to determine the voltage information of the battery 870.

Optionally, the computer program is configured to be executed by the processor 810, to implement the following steps: transmitting the voltage information and the current information of the battery 870 to the external wireless charging device through the induction coil; or, transmitting the voltage information and the current information of the battery 870 to the external wireless charging device through Bluetooth and/or infrared communication.

Optionally, the computer program is configured to be executed by the processor 810, to implement the following steps: detecting whether the charging DC corresponds to the voltage information and/or the current information of the battery 870; when the charging DC corresponds to the voltage information and/or the current information of the battery 870, controlling the switching unit to be in the on state; and when the charging DC does not correspond to the voltage information and/or the current information of the battery 870, compensating the charging DC, or controlling the switching unit to be in the off state, and re-transmitting the voltage information and the current information of the battery 870 to the external wireless charging device.

The mobile terminal 800 provided in the embodiments of the present disclosure controls the external wireless charging device to generate different electrical signals at different stages of charging by acquiring the present voltage information of the battery 870 in real time, and directly inputs the charging DC generated by inducing the electrical signals into the battery 870, thus the power conversion efficiency and the charging efficiency of the wireless charging system are significantly improved, and temperature of the mobile terminal 800 is prevented from being too high during the wireless charging process, and wireless quick charging with high-voltage and high-current may be realized.

Figure 9:
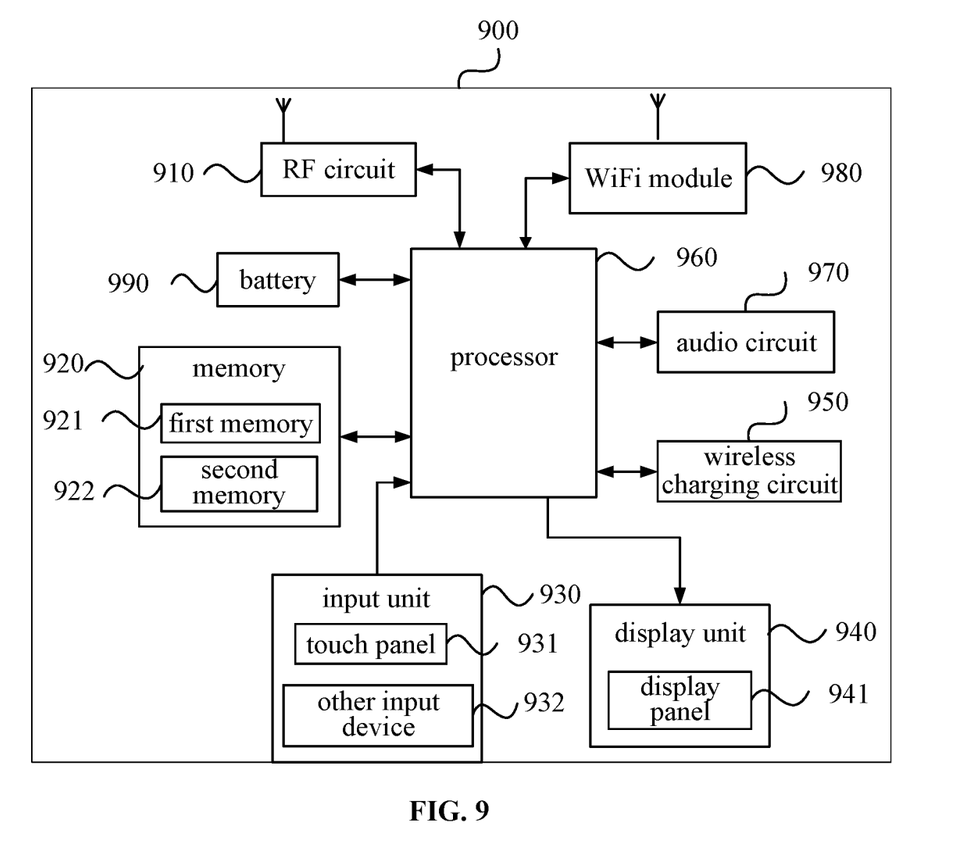
FIG. 9 is a second schematic structural diagram of a mobile terminal according to an embodiment of the present disclosure.

FIG. 9 is a schematic structural diagram of a mobile terminal 900 according to another embodiment of the present disclosure. Specifically, the mobile terminal 900 in FIG. 9 may be a mobile phone, a tablet computer, a Personal Digital Assistant (PDA), a vehicle-mounted computer, or the like.

The mobile terminal 900 in FIG. 9 includes a Radio Frequency (RF) circuit 910, a memory 920, an input unit 930, a display unit 940, a wireless charging circuit 950, a processor 960, an audio circuit 970, a WiFi (Wireless Fidelity) module 980, and a battery 990.

The input unit 930 may be configured to receive digital or character information input by a user, and generate signal inputs related to user settings and function control of the mobile terminal 900. Specifically, in the embodiments of the present disclosure, the input unit 930 may include a touch panel 931. The touch panel 931, also known as a touch screen, can acquire the user's touch operation on or near the touch panel 931 (such as user's operations on the touch panel 931 using any suitable object or accessory such as a finger or a stylus), and drive a corresponding connecting device according to a preset program. Optionally, the touch panel 931 may include two parts: a touch detection device and a touch controller. The touch detection device detects a touch position of the user, and detects a signal brought by the touch operation, and transmits the signal to the touch controller; and the touch controller receives touch information from the touch detection device, converts it into contact coordinates, and then transmits contact coordinates to the processor 960, and receives commands from the processor 960 and executes them. In addition, various types such as resistive, capacitive, infrared, and surface acoustic wave may be used to implement the touch panel 931. In addition to the touch panel 931, the input unit 930 may also include other input devices 932, which may include, but are not limited to, one or more of a physical keyboard, function keys (such as volume control keys, switch keys, etc.), trackball, mouse, joystick, etc.

The display unit 940 may be configured to display information input by the user or information provided to the user and various menu interfaces of the mobile terminal 900. The display unit 940 may include a display panel 941. Optionally, the display panel 941 may be configured in a form of an LCD or an Organic Light-Emitting Diode (OLED) or the like.

It should be noted that the touch panel 931 may cover the display panel 941 to form a touch display screen. When the touch display screen detects a touch operation on or near it, the touch operation is transmitted to the processor 960 to determine a type of a touch event, and then the processor 960 provides a corresponding visual output on the touch display according to the type of the touch event.

The touch display screen includes a display region of an application program interface and a display region of commonly used controls. An arrangement of the display region of the application program interface and the display region of the commonly used controls is not limited, and they may be arranged up and down, left and right, to distinguish the two display regions from each other. The display region of the application program interface may be used to display an interface of an application program. Each interface may include an interface element such as an icon and/or a widget desktop control of at least one application. The display region of the application program interface may also be an empty interface without any content. The display region of the commonly used controls are used to display frequently used controls, such as setting buttons, interface numbers, scroll bars, application icons such as phonebook icons, and so on.

The processor 960 is a control center of the mobile terminal 900, which uses various interfaces and lines to connect various parts of an entire mobile phone. Through running or executing software programs and/or modules stored in a first memory 921, and calling data stored in a second memory 922, various functions and data of the mobile terminal 900 are performed and processed, thereby performing overall monitoring of the mobile terminal 900. Optionally, the processor 960 may include one or more processing units.

In the embodiments of the present disclosure, the mobile terminal 900 further includes a computer program stored on the memory 920 and executable on the processor 960. The computer program is configured to be executed by the processor 960, to implement the following steps: acquiring voltage information of the battery 990 in the mobile terminal 900; determining current information of the battery 990 according to the voltage information of the battery 990 during a charging process of the battery 990; transmitting the voltage information and the current information of the battery 990 to the external wireless charging device; generating the charging DC by inducing the electrical signal, wherein the electrical signal is generated by the external wireless charging device according to the voltage information and the current information of the battery 990; and inputting the charging DC into the battery 990.

Optionally, the computer program is configured to be executed by the processor 960, to implement the following steps: acquiring the voltage between two ends of the current sampling resistor to determine the voltage information of the battery 990.

Optionally, the computer program is configured to be executed by the processor 960, to implement the following steps: transmitting the voltage information and the current information of the battery 990 to the external wireless charging device through the induction coil; or, transmitting the voltage information and the current information of the battery 990 to the external wireless charging device through Bluetooth and/or infrared communication.

Optionally, the computer program is configured to be executed by the processor 960, to implement the following steps: detecting whether the charging DC corresponds to the voltage information and/or the current information of the battery 990; when the charging DC corresponds to the voltage information and/or the current information of the battery 990, controlling the switching unit to be in the on state; when the charging DC does not correspond to the voltage information and/or the current information of the battery 990, compensating the charging DC, or controlling the switching unit to be in the off state, and re-transmitting the voltage information and the current information of the battery 990 to the external wireless charging device.

The mobile terminal 900 provided in the embodiments of the present disclosure controls the external wireless charging device to generate the different electrical signals at different stages of charging by acquiring the present voltage information of the battery 990 in real time, and directly inputs the charging DC generated by inducing the electrical signals to the battery 990, thus the power conversion efficiency and the charging efficiency of the wireless charging system are significantly improved, and temperature of the mobile terminal 900 is prevented from being too high during the wireless charging process, and wireless quick charging with high-voltage and high-current may be realized.

Those of ordinary skill in the art may realize that the units and algorithm steps of each example described in combination with the embodiments disclosed herein may be implemented in electronic hardware, or a combination of computer software and electronic hardware. Whether these functions are performed in hardware or software depends on a specific application and design constraints of the technical solution. A professional technician may implement the described functions in varying ways for each specific application, but such implementation should not be considered beyond the scope of the present disclosure.

Those of ordinary skill in the art may clearly understand that, for the convenience and brevity of description, the specific working processes of the systems, devices, and units described above may refer to the corresponding processes in the above method embodiments, which will not be repeated here.

In the embodiments provided by the present application, it should be appreciated that the disclosed device and method may be implemented in other manners. For example, the device embodiments described above are merely illustrative. For example, division of the units is merely a logical function division. In actual implementation, there may be another division manner. For example, multiple units or components may be combined, or may be integrated into another system, or some features may be ignored or not executed. In addition, coupling or direct coupling or communication connection between the components shown or discussed may be indirect coupling or a communication connection through some interfaces, devices or units, and may be electrical, mechanical or other forms.

The units described as separate components may or may not be physically separated, and the components displayed as the units may or may not be physical units, that is, they may be located in one place or distributed to multiple network units. Some or all of the units may be selected according to actual needs to achieve objectives of the present disclosure.

In addition, different functional units in the different embodiments of the present disclosure may be integrated into one processing unit, or may physically exist separately, or two or more units may be integrated into one unit.

When the functions are implemented in a form of software functional units and sold or used as independent products, they may be stored in a computer-readable storage medium. Based on this understanding, the technical solution of the present disclosure essentially, or a part that contributes to the related art, or a part of the technical solution may be embodied in a form of a software product. The computer software product is stored in a storage medium and includes instructions for causing a computer device (for example, a personal computer, a server, or a network device) to perform all or part of the steps of the method described in various embodiments of the present disclosure. The above storage medium includes various media that can store program codes, such as a Universal Serial Bus (USB) flash disk, a mobile hard disk, a ROM, a RAM, a magnetic disk, or an optical disk, and the like.

The above content is only the specific embodiments of the present disclosure, but the scope of the present disclosure is not limited thereto. Any changes or substitutions easily conceived by those of ordinary skill in the art in the technical scope of the disclosure should fall within the protection scope of the disclosure. Therefore, the protection scope of the present disclosure should be determined by the scope of the appended claims.

What is claimed is:

1. A wireless charging circuit applied to a mobile terminal, wherein the wireless charging circuit comprises:
   an acquisition unit, configured to acquire voltage information of a battery in the mobile terminal;
   a charging control unit, wherein the charging control unit is connected to the acquisition unit, and configured to obtain the voltage information of the battery acquired by the acquisition unit, and determine current information of the battery according to the voltage information during a charging process of the battery, wherein the charging control unit is further configured to detect whether the charging DC generated by the receiving unit corresponds to the voltage information and/or the current information of the battery, when the charging DC corresponds to the voltage information and/or the current information of the battery, the charging control unit is further configured to control the switching unit to be in the on state; and when the charging DC does not correspond to the voltage information and/or the current information of the battery, the charging control unit is further configured to compensate the charging DC, or control the switching unit be in the off state and trigger the first communication unit to re-transmit the voltage information and the current information of the battery to the external wireless charging device;

a first communication unit, wherein the first communication unit is connected to the charging control unit, and configured to transmit the voltage information and the current information of the battery to an external wireless charging device;

a receiving unit, configured to generate a charging Direct Current (DC) by inducing an electrical signal, wherein the electrical signal is generated by the external wireless charging device according to the voltage information and the current information of the battery; and a switching unit, wherein one end of the switching unit is connected to the receiving unit, and the other end of the switching unit is connected to the acquisition unit, and the switching unit is configured to, when the switching unit is an on state, input the charging DC generated by the receiving unit into the battery through the acquisition unit.

2. The wireless charging circuit according to claim 1, wherein
the acquisition unit comprises a current sampling resistor, a first end of the current sampling resistor is connected to the battery, and a second end of the current sampling resistor is connected to the charging control unit; and
the charging control unit is further configured to acquire a voltage between two ends of the current sampling resistor, to determine the voltage information of the battery.

3. The wireless charging circuit according to claim 1, wherein
the first communication unit is further configured to transmit the voltage information and the current information of the battery to the external wireless charging device through an induction coil; or
the first communication unit is further configured to transmit the voltage information and the current information of the battery to the external wireless charging device through Bluetooth or infrared communication.

4. The wireless charging circuit according to claim 1, wherein
the switching unit is further connected to the charging control unit, and further configured to be in the on state or an off state under the control of the charging control unit; and
the switching unit comprises a load switch and/or a transistor.

5. The wireless charging circuit according to claim 4, wherein
the switching unit comprises a first transistor and a second transistor, and the first transistor and the second transistor are N-type transistors;
a gate electrode of the first transistor is connected to the charge control unit, a source electrode of the first transistor is connected to the acquisition unit, and a drain electrode of the first transistor is connected to the second transistor; and
a gate electrode of the second transistor is connected to the charge control unit, a source electrode of the second transistor is connected to the receiving unit, and a drain electrode of the second transistor is connected to the first transistor.

6. The wireless charging circuit according to claim 1, wherein the charging control unit is connected to a central processing unit of the mobile terminal through an internal integrated circuit bus interface; and
the charging control unit is connected to the acquisition unit and the receiving unit through an analog-to-digital conversion circuit.

7. The wireless charging circuit according to claim 1, wherein the receiving unit further comprises:
a rectifying unit, configured to convert the electrical signal induced by the receiving unit into the charging DC.

8. A wireless charging method, comprising:
acquiring voltage information of a battery in a mobile terminal;
determining current information of the battery according to the voltage information of the battery during a charging process of the battery;
transmitting the voltage information and the current information of the battery to an external wireless charging device;
generating a charging DC by inducing an electrical signal, wherein the electrical signal is generated by the external wireless charging device according to the voltage information and the current information of the battery; and
inputting the charging DC into the battery;
wherein the determining current information of the battery according to the voltage information of the battery during a charging process of the battery further comprises: detecting whether the charging DC corresponds to the voltage information and/or the current information of the battery;
when the charging DC corresponds to the voltage information and/or the current information of the battery, controlling a switching unit to be in an on state; and
when the charging DC does not correspond to the voltage information and/or the current information of the battery, compensating the charging DC, or controlling the switching unit to be in an off state and re-transmitting the voltage information and the current information of the battery to the external wireless charging device.

9. The method according to claim 8, wherein acquiring the voltage information of the battery in the mobile terminal comprises:
acquiring a voltage between two ends of a current sampling resistor, to determine the voltage information of the battery.

10. The method according to claim 8, wherein transmitting the voltage information and the current information of the battery to the external wireless charging device comprises:
transmitting the voltage information and the current information of the battery to the external wireless charging device through an induction coil; or
transmitting the voltage information and the current information of the battery to the external wireless charging device through Bluetooth and/or infrared communication.

11. A wireless charging system comprising a first wireless charging device and a second wireless charging device, wherein the first wireless charging device comprises the wireless charging circuit according to claim 1,
the first wireless charging device is configured to acquire voltage information of a battery in a mobile terminal, transmit the voltage information and the current information to the second wireless charging device, generate the charging DC by inducing the electrical signal, and input the charging DC into the battery, wherein the current information is current information of the battery during the charging process of the battery, the current information is generated based on the voltage information, and the electrical signal is generated by the second wireless charging device according to the voltage information and the current information of the battery; and the second wireless charging device is configured to generate a corresponding electrical signal according to the received voltage information and the received current information of the battery.

12. The wireless charging system according to claim 11, wherein the second wireless charging device comprises:
a second communication unit, configured to receive the voltage information and the current information of the battery transmitted by the first wireless charging device; and
a generating unit, configured to generate a corresponding electrical signal based on the voltage information and the current information of the battery received by the second communication unit.

13. A mobile terminal comprising the wireless charging circuit according to claim 1.

14. The mobile terminal according to claim 13, wherein the acquisition unit comprises a current sampling resistor, a first end of the current sampling resistor is connected to the battery, and a second end of the current sampling resistor is connected to the charging control unit; and
the charging control unit is further configured to acquire a voltage between two ends of the current sampling resistor, to determine the voltage information of the battery.

15. The mobile terminal according to claim 13, wherein the first communication unit is further configured to transmit the voltage information and the current information of the battery to the external wireless charging device through an induction coil; or
the first communication unit is further configured to transmit the voltage information and the current information of the battery to the external wireless charging device through Bluetooth or infrared communication.

16. The mobile terminal according to claim 13, wherein the switching unit is further connected to the charging control unit, and further configured to be in the on state or an off state under the control of the charging control unit; and
the switching unit comprises a load switch and/or a transistor.

17. The mobile terminal according to claim 16, wherein the switching unit comprises a first transistor and a second transistor, and the first transistor and the second transistor are N-type transistors;
a gate electrode of the first transistor is connected to the charge control unit, a source electrode of the first transistor is connected to the acquisition unit, and a drain electrode of the first transistor is connected to the second transistor; and
a gate electrode of the second transistor is connected to the charge control unit, a source electrode of the second transistor is connected to the receiving unit, and a drain electrode of the second transistor is connected to the first transistor.

18. The mobile terminal claim 13, wherein
the charging control unit is further configured to detect whether the charging DC generated by the receiving unit corresponds to the voltage information and/or the current information of the battery;
when the charging DC corresponds to the voltage information and/or the current information of the battery, the charging control unit is further configured to control the switching unit to be in the on state; and
when the charging DC does not correspond to the voltage information and/or the current information of the battery, the charging control unit is further configured to compensate the charging DC, or control the switching unit be in the off state and trigger the first communication unit to re-transmit the voltage information and the current information of the battery to the external wireless charging device.

* * * * *